United States Patent [19]

Betten

[11] 4,097,331
[45] Jun. 27, 1978

[54] COOLANT MASS FLOW EQUALIZER FOR NUCLEAR FUEL

[75] Inventor: Paul R. Betten, Windsor, Conn.

[73] Assignee: The United States of America as represented by the United States Department of Energy, Washington, D.C.

[21] Appl. No.: 646,010

[22] Filed: Jan. 2, 1976

[51] Int. Cl.² ............................................. G21C 3/08
[52] U.S. Cl. ........................................ 176/81; 176/78
[58] Field of Search ............................. 176/78, 81, 40

[56] References Cited

U.S. PATENT DOCUMENTS

| 3,150,057 | 9/1964 | Monson et al. | 176/78 |
| 3,607,642 | 9/1971 | Murdock | 176/81 |
| 3,677,893 | 7/1972 | Huebotter et al. | 176/40 |
| 3,702,803 | 11/1972 | Huebotter | 176/78 |
| 3,767,525 | 10/1973 | Seim et al. | 176/78 |
| 3,930,940 | 1/1976 | Cayol et al. | 176/81 |

Primary Examiner—Harvey E. Behrend
Attorney, Agent, or Firm—Dean E. Carlson; Randall G. Erdley; Roger A. Van Kirk

[57] ABSTRACT

The coolant mass flow distribution in a liquid metal cooled reactor is enhanced by restricting flow in sub-channels defined in part by the peripheral fuel elements of a fuel assembly. This flow restriction, which results in more coolant flow in interior sub-channels, is achieved through the use of a corrugated liner positioned between the bundle of fuel elements and the inner wall of the fuel assembly coolant duct. The corrugated liner is expandable to accommodate irradiation induced growth of fuel assembly components.

9 Claims, 5 Drawing Figures

COOLANT MASS FLOW EQUALIZER FOR NUCLEAR FUEL

ORIGIN OF THE INVENTION

The invention disclosed herein was made in the course of or under a contract with the United States Atomic Energy Commission.

BACKGROUND OF THE INVENTION:

1. Field of the Invention

The present invention relates to improving the temperature profile across a fluid cooled subassembly and to accommodating differential growth of components of such a fluid cooled subassembly. More specifically, this invention is directed to a fuel assembly for a nuclear reactor, and specifically a liquid metal cooled fast breeder reactor, characterized by improved coolant mass flow distribution and close fitting of fuel assembly components over the operational life thereof. Accordingly, the general objects of the present invention are to provide novel and improved methods and apparatus of such character.

2. Description of the Prior Art

While not limited thereto in its utility, the present invention is particularly well suited for utilization in liquid metal fast breeder reactors (LMFBR). Liquid metal cooled breeder reactors may offer a partial solution to the problems of fossil fuel shortages and overall rapidly escalating energy costs and such reactors are thus attracting considerable interest and study. As is well known, in the design of a neclear reactor particular consideration must be given to insuring that there will be no overheating of individual fuel elements and provision must be made for accommodation of irradiation induced growth of fuel assembly components. The problems associated with achieving proper coolant flow distribution to avoid local overheating and accommodation of component growth, especially differential growth, become particularly critical in the case of liquid metal cooled fast breeder reactors.

Fast breeder reactors which have previously been designed include a plurality of fuel assemblies. Each of these fuel assemblies comprises a bundle of elongated fuel rods mounted within a coolant duct. The fuel rods are spaced from one another and are substantially parallelly arranged. A coolant, typically liquid sodium, will be casued to flow through the duct and through the spaces or sub-channels between the parallel fuel rods and between the fuel rods of the outer row and the walls of the duct. Heat will be transferred from the fuel rod cladding to the coolant and energy produced by the fission reaction will thus be delivered to suitable equipment for utilization. The fuel rod cladding must have a reasonably low neutron cross-section while providing adequate containment of the fuel and fission products at the operational temperatures encountered.

A recognized problem in the case of LMFBR fuel assemblies resides in the fact that more coolant flow tends to occur in the peripheral sub-channels; i.e., between the outer row of fuel rods and the coolant duct of each fuel assembly; than in the center or interior sub-channels. This uneven mass flow distribution results in less coolant flow and turbulent mixing for the interior sub-channels which, in turn, causes the fuel rods which define these interior sub-channels to operate at higher temperatures. It is, of course, desired that the reactor be operated at the highest temperature consistent with insuring that the cladding of the "hottest" fuel rod is not subjected to a temperature which could cause melting and rupture thereof.

It has previously been prosposed to insure even spacing between the fuel rods of LMFBR fuel assemblies through the use of a helically wound wire wrap spacer associated with each rod. The helically wound wire wrap spacers, in addition to locating the fuel rods and determining the spacing therebetween, provide a higher degree of fluid mixing and a lower fluid pressure drop than would be achieved employing spacer grids of the types commonly utilized in pressurized water reactors. However, the wire wrap does not necessarily improve the mixing or distribution between the interior and peripheral sub-channels of each fuel assembly and there still exists a large difference between the mass flows of the interior and peripheral coolant flow subchannels. Restated, the presence of the wire spacers, which wrap each of the fuel pins in a spiral pattern, causes diversion of coolant from one sub-channel to an adjacent sub-channel with the effect of reducing the coolant temperature difference between such adjacent sub-channels. However, this reduction in coolant temperature difference between adjacent sub-channels, due to fluid mixing and conduction, will not solve the problem of a possible large temperature difference between the peripheral and interior channels.

The preceding comments notwithstanding, the wire wrap design has the advantages of providing accurate spacing between adjacent fuel rods, a lower coolant pressure drop and a more continuous fluid mixing along the length of the fuel assembly. For an example of a LMFBR fuel assembly which employs a wire design, reference may be had to U.S. Pat. No. 3,677,893. As noted, the wire wrap design will not of itself provide the desired optimum mass flow and temperature distrubution between the peripheral and interior coolant flow sub-channels and previous attempts to overcome these mass flow distrubution problems, for example through the addition of a second wire wrap which completely encloses the outer row of fuel rods of each fuel assembly, have failed to completely overcome the mass flow distribution problem and have introduced an undesirable added degree of complexity to the design and fabrication of the fuel assembly.

As is also well known, the materials employed as cladding for the fuel rods of LMFBR's, type 316 stainless steel for example, experience swelling at temperatures above about 650° F subsequent to irradiation with fast neutrons for a substantial length of time. There is, additionally, differential irradiation induced growth between the fuel rods, wire wraps and fuel assembly duct walls. It has been standard practice in the prior art to accommodate this swelling and irradiation induced growth by initially relaxing the system tolerances; i.e., by building a certain amount of "slop" into the fuel assembly. However, as in the case of promoting the proper coolant mass flow distrubution, the accommodation of differential growth and swelling must be accomplished in a manner which will not contribute to fuel rod cladding failure. There are many mechanisms which, as a result of swelling, can cuase fuel rod failure. These mechanisms include the thinning of the cladding, localized stress concentrations and hot spots. The past practice of accommodating differential growth by providing an additional clearance, for example 2 mils per fuel rod, results in a loose fit between fuel assembly components at the beginning-of-life and, over the fuel assembly life, the component swelling will gradually fill the space until a tight fit is obtained at the end-of-life. The disadvantages of this approach are that the changing tolerances can affect neutronic and thermal-hydraulic characteristics, the amount of swelling must be accurately predicted apriori, fretting and vibration problems may occur initially and accurate fabrication methods are required. There has not previously been available a method of absorbing swelling and irradiation induced growth that will also insure that tight tolerances are maintained over the life of the fuel assembly thereby providing consistent neutronic, thermal-hydraulic and vibration-free operating characteristics.

SUMMARY OF THE INVENTION

The present invention overcomes the above briefly discussed and other deficiencies and disadvantages of the prior art by providing a novel fuel assembly, particularly well suited for use in liquid metal cooled fast breeder reactors, which is characterized by a corrugated liner which preferably has duct wall contacting projections. Thus, a fuel assembly liner in accordance with the invention includes portions; i.e., corrugations; which are bent inwardly with respect to the remainder of the liner in accordance with a repetitive pattern determined by the pitch of spiral wire wraps on the fuel assembly fuel rods. The inwardly bent liner portions correspond with regions where the wire wrap on the peripheral fuel rods is disposed generally away from the liner thus permitting a reduction in clearance between the liner and the peripheral fuel rods in these regions. The reduction in clearance, in turn, enhances coolant flow in the interior sub-channels of the fuel assembly at the expense of coolant flow in the peripheral sub-channels and thus provides an improved coolant temperature profile.

The fuel assembly liner in accordance with the present invention may also be provided with projections which extend outwardly from those alternate portions of the liner which are not deflected inwardly; such projections contacting the inner wall of the fuel assembly coolant duct. These projections will function as springs and thus will compress or flatten out in response to irradiation induced swelling or differential growth of fuel assembly components whereby new growth of such components will be accommodated.

Also in accordance with the invention, where the opposite edges of the sheet material which is formed into the liner meet, the liner may be closed on itself either by welding or these edges may be joined by means of duct liner springs. These duct liner springs, if present, will accommodate growth by permitting the entire liner to expand.

BRIEF DESCRIPTION OF THE DRAWING:

The present invention may be better undestood and its numerous objects and advantages will become apparent to those skilled in the art by reference to the accompanying drawing wherein like reference numerals refer to like elements in the several figures and in which.

Figure 1:
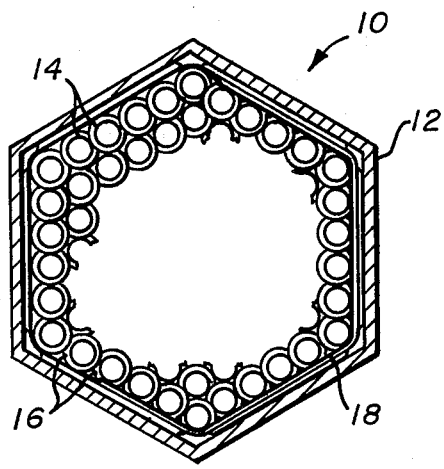
FIG. 1 is a cross-sectional top view of a hexagonal fuel assembly of the type with which the present invention may be employed.

DESCRIPTION OF THE PREFERRED EMBODIMENT:

Referring to FIG. 1, a hexagonally shaped fuel assembly for use in a liquid metal cooled fast breeder reactor is indicated generally at 10. Fuel assembly 10 would, in the reactor core, be associated wth a pluraltiy of identical additional fuel assemblies. Fuel assembly 10 includes a continuous outer shroud or coolant duct defining member 12. Uniformly spaced within duct 12, which may be comprised of stainless steel, are a pluraltiy of fuel rods 14. Fuel rods 14, which are also known in the art as fuel elements or fuel pins, are circular in cross-section, elongated and will typically be provided with an external cladding of stainless steel which provides for the containment of the fissionable fuel. Fuel rods 14 are oriented in a spaced parallel relationship and the spacing between adjacent rods is determined and maintained by helical wire wraps 16; the wire wraps also typically being comprised of stainless steel and being individually associated with each fuel rod as is conventional prior art practice. Fuel assembly 10 also includes, between the outer row of fuel rods 14 and the inside of duct 12, a liner 18.

Figure 4:
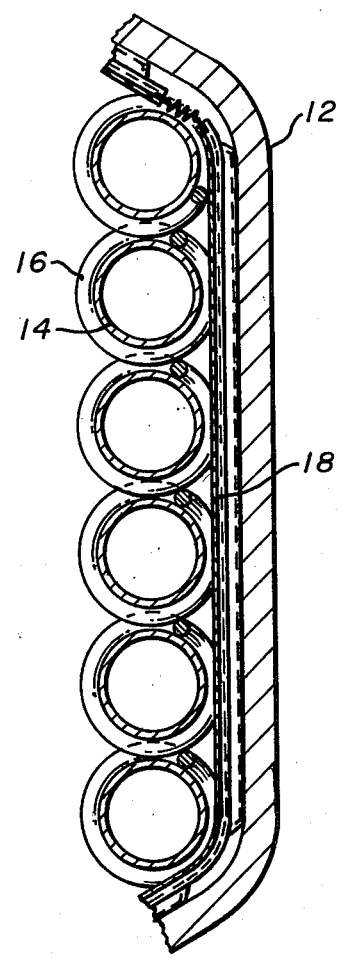
FIG. 4 is a partial cross-sectional top view of a fuel assembly employing the liner of FIG. 2.
Figure 2:
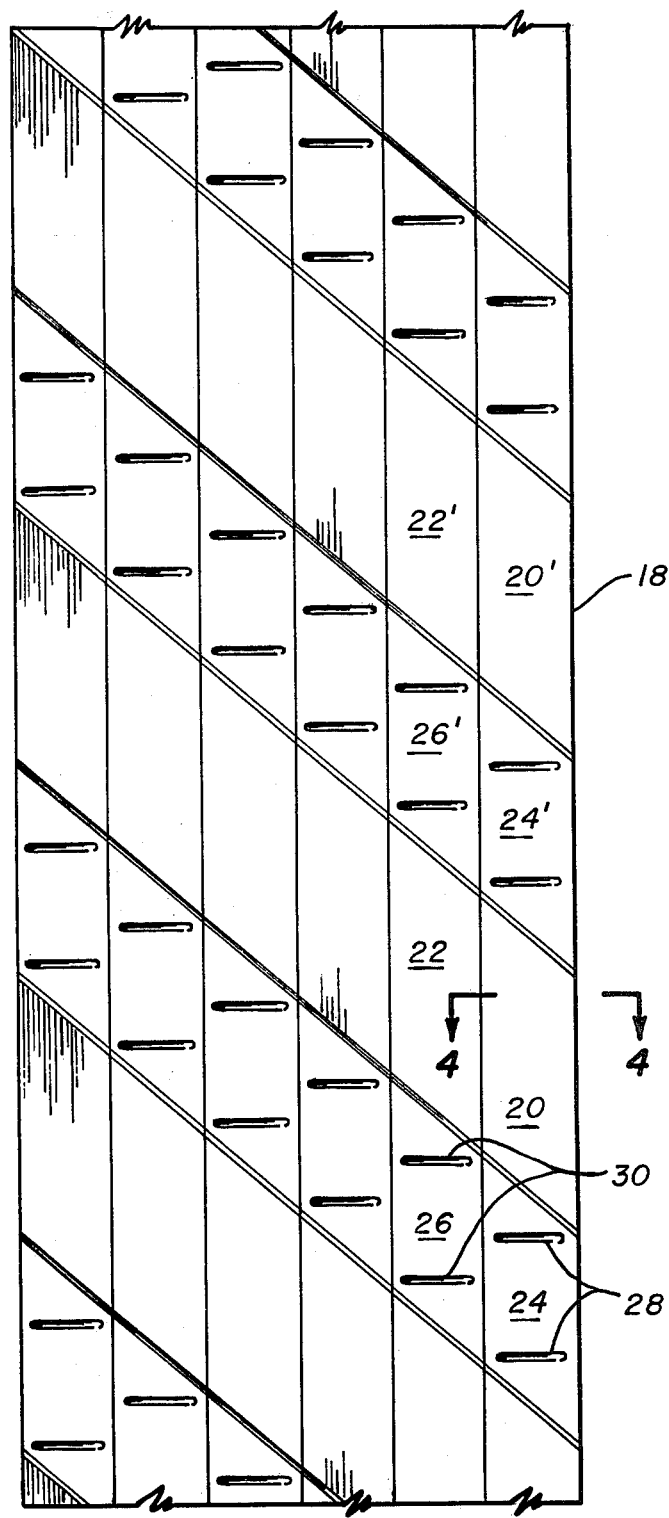
FIG. 2 is a partial plan view, prior to assembly, of a fuel assembly coolant duct liner in accordance with a first embodiment of the present invention.
Figure 3:
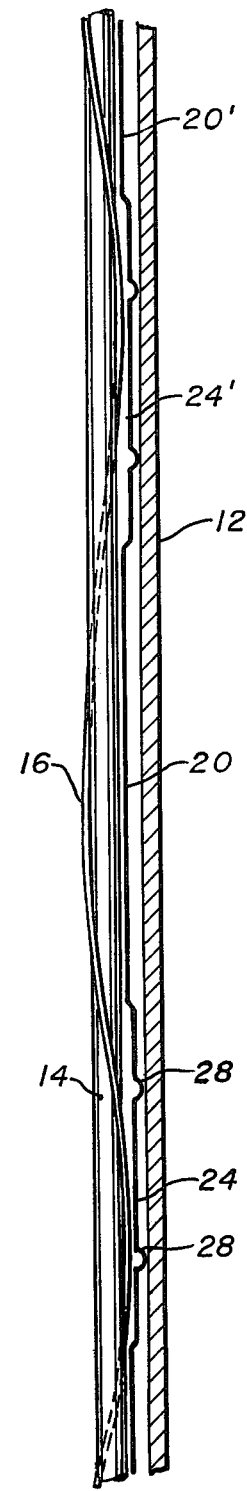
FIG. 3 is a partial cross-sectional side elevation view of a fuel assembly employing the liner of FIG. 2.

Considering jointly FIGS. 2-4, in accordance with a first embodiment the present invention resides in a novel liner 18 which achieves the above described objectives of accommodating swelling and irradiation induced growth while simultaneously assisting in promoting proper coolant mass flow distrubution in the fuel assembly. In FIG. 2 the liner 18 is shown subsequent to stamping, to define the requisite contour, but prior to folding into the hexagonal shape commensurate with the fuel assembly configuration defined by duct 12. During formation the liner 18 is stamped to provide alternate portions which extend inwardly towards the fuel rods. These inwardly extending portions, as indicated at 20 and 20' for a first side of the liner and at 22 and 22' for a second adjacent side of the liner are vertically offset progressing from one side section or panel to the next. The undeflected portions of the liner; i.e., the sections of each side panel between inwardly bent sections 20 and 22; have been indicated at 24 and 26 respectively for the same two side sections of the liner. The relative positioning of the vertically alternating inwardly bent and undeflected portions of a first side of the liner may clearly be seen from FIG. 3.

Each of the portions of each side of the liner intermediate the inwardly bent portions, for example portions 24 of a first side of the liner and portions 26 of a second side of the liner, are provided with outwardly extending dimples or ridges as indicated respectively at 28 and 30. As may be seen from FIG. 3, these dimples or ridges 28 extend in the opposite direction from the "normal" plane of the liner when compared to the inwardly deflected inner portions 20, 22, etc. and the dimples 28 contact the inner wall of duct 12 thus determining the initial positioning of the liner with respect to duct 12.

It is particularly to be noted that the inwardly bent portions of the liner, such as portions 20 and 20', are positioned such that these portions occur in regions where the wire wrap 16 on the fuel rods spirals inwardly away from the liner. This arrangement may be clearly seen from FIG. 3 and results in minimizing the clearance between liner 18 and the fuel rods of the outer row; the areas of reduced clearance being in an alternating pattern defined by the pitch of the wire wrap. The reduction in clearance allowed by the inwardly bent portions of liner 18; i.e., the raised metal surfaces of the inner wall of the hexagonal liner; provides a frictional barrier to coolant flow in the peripheral sub-channels of the fuel assembly. The net effect is that there will be more coolant flow in the interior sub-channels and less in the peripheral sub-channels and this result, in turn, provides an improved coolant temperature profile. The diversion of coolant from the peripheral sub-channels to the interior sub-channels also results in more interchannel turbulence and mixing. In the embodiment of FIG. 2, the diversion of coolant from the peripheral to the interior sub-channels is enhanced by the steering effect of the inclined leading and trailing edges of each inwardly bent portion of liner 18; the inclined edges being clearly shown in FIG. 2. From FIG. 3 it may also be seen that in the region where the wire wraps 16 spiral to the outside; i.e. the wraps are on the side of the fuel rods of the outer row disposed toward the liner 18; with the exception of the formation of the outwardly extending dimples 28 the liner is undeflected.

Swelling or differential growth is accommodated, in the embodiment of FIGS. 2–4, by compression or flattening of the ridges 28, 30, etc.; i.e., the ridges function as springs which contact the inner wall of duct 12. Swelling may also be accommodated by deformation of the entire liner in accordance with the alternative of FIG. 4. In FIG. 4 the abutting edges of the liner where it closes on itself are not welded together but rather are interconnected by means of a plurality of springs; one spring 32 being depicted in the drawing. As the fuel pins swell the duct liner springs 30 elongate to accommodate the new growth. It will be understood, however, that springs 30 may not be required for operation and swelling and differential growth may be accommodated solely by the flattening of the ridges 28, 30, etc. The use of the liner with the compressible ridges and/or the inclusion of the duct liner springs 32 permits a significant reduction in fabrication cost since the liner absorbs the loose tolerances which were previously required in order to accommodate swelling and differential growth.

Considering further FIG. 4, it is to be noted that this figure depicts a typical fuel assembly wherein there are six fuel rods in the outer periphery or row of the fuel assembly along each side of the fuel assembly. FIG. 4, of course, is a view taken along line 4—4 of the liner of FIG. 2 subsequent to that liner being folded on itself and incorporated into the fuel assembly.

Figure 5:
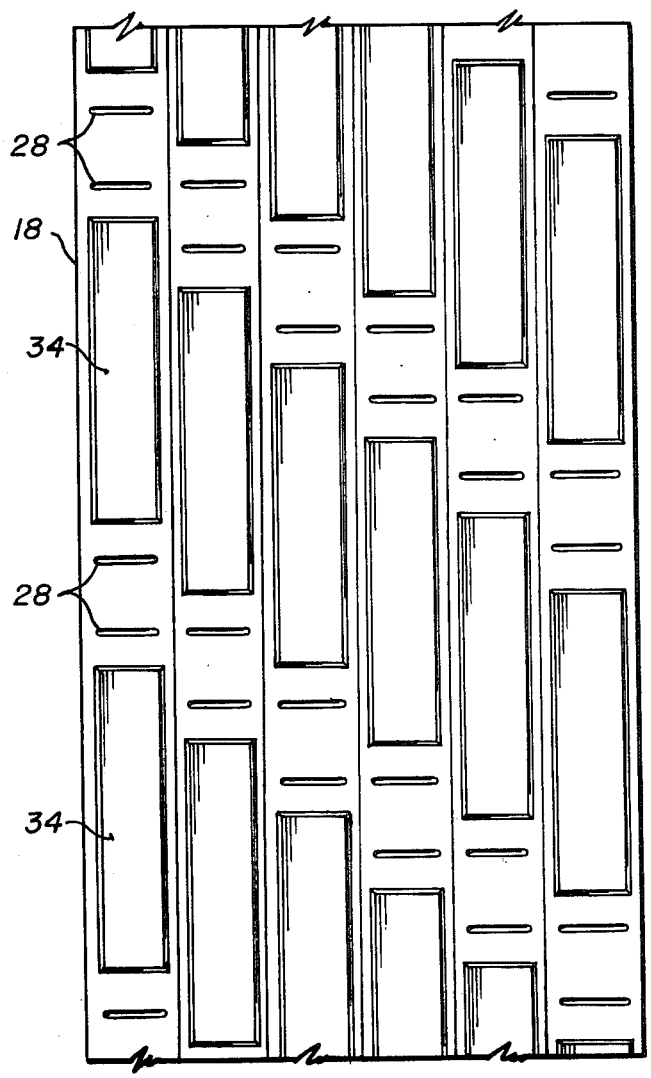
FIG. 5 is a partial side elevation view, before assembly, of a fuel assembly coolant duct liner in accordance with a second embodiment of the invention.

Referring now to FIG. 5, a second embodiment of a liner is depicted in the same unassembled form as shown in the case of the liner of FIG. 2. The liner of FIG. 5 differs from that of FIG. 2 in that the inwardly bent portions 34 of each vertical section or side are vertically offset in stepwise fashion proceeding around the liner. Thus, the inwardly bent portions of the liner of the FIG. 5 embodiment have generally horizontal leading and trailing edges rather than the inclined leading and trailing edges which characterize the FIG. 2 embodiment. The liner of FIG. 5 may also be provided with the ridges 28 which function as springs for accommodating swelling and differential growth.

While preferred embodiments have been shown and described, various modifications and substitutions may be made thereto without departing from the spirit and scope of the invention. Accordingly, it will be understood that the present invention has been described by way of illustration and not limitation.

What is claimed is:

1. In a fuel assembly for a nuclear reactor, the fuel assembly including a coolant duct and a bundle of elongated parallel fuel rods positioned within the duct, the fuel rods each being provided with a spirally wound external spacer member, the fuel assembly having a plurality of sides defined by straight wall portions of the coolant duct, the improvement comprising:

a corrugated sleeve positioned within said coolant duct between the fuel rods and the inner wall of the duct, said sleeve having a shape commensurate with the interior shape of the duct and comprising:

a liner defining member, the liner defined by said member having a plurality of sides oriented generally parallel to the coolant duct inner walls immediately adjacent thereto;

a plurality of vertically spaced inwardly displaced portions of said liner defining member, said inwardly displaced liner portions having a parallelogram shape, the frequency of occurrence and length of said inwardly displaced liner portions being determined by the pitch of the spirally wound spacer members, said inwardly displaced liner portions occurring in regions where the spacer member on the peripheral fuel rods of the fuel rod bundle are on the sides of the fuel rods disposed away from the coolant duct wall whereby said inwardly displaced liner portions are vertically displaced on adjacent sides of the liner and closely approach the peripheral fuel rods; and spring means on said liner defining member, said spring means permitting expansion of the liner toward the coolant duct.

2. The apparatus of claim 1 wherein said spring means comprise:

outwardly extending projections on said liner defining member, and projections being located in portions of said liner defining member disposed intermediate said inwardly displaced liner portions.

3. The apparatus of claim 2 wherein said outwardly extending projections comprise:

ridges formed in said liner defining member, said ridges being oriented generally transversely of the axes of the fuel rods, said ridges extending outwardly to contact the inner wall of the coolant duct.

4. The apparatus of claim 1 wherein said inwardly displaced liner portions are of rectangular shape.

5. The apparatus of claim 1 wherein said inwardly displaced liner portions are provided with inclined upper and lower edges, said edges defining a substantially straight line about the liner.

6. The apparatus of claim 3 wherein there are at least two of said ridges in each of said intermediate portions of said liner.

7. The apparatus of claim 6 wherein said ridges extend in opposite directions from the midpoint of each side of the liner and encompass in excess of 50% of the width of each side of the liner.

8. The apparatus of claim 7 wherein said inwardly displaced liner portions are of rectangular shape.

9. The apparatus of claim 7 wherein said inwardly displaced liner portions are provided with inclined upper and lower edges, said edges defining a substantially straight line about the liner.

* * * * *